Patented Jan. 12, 1932

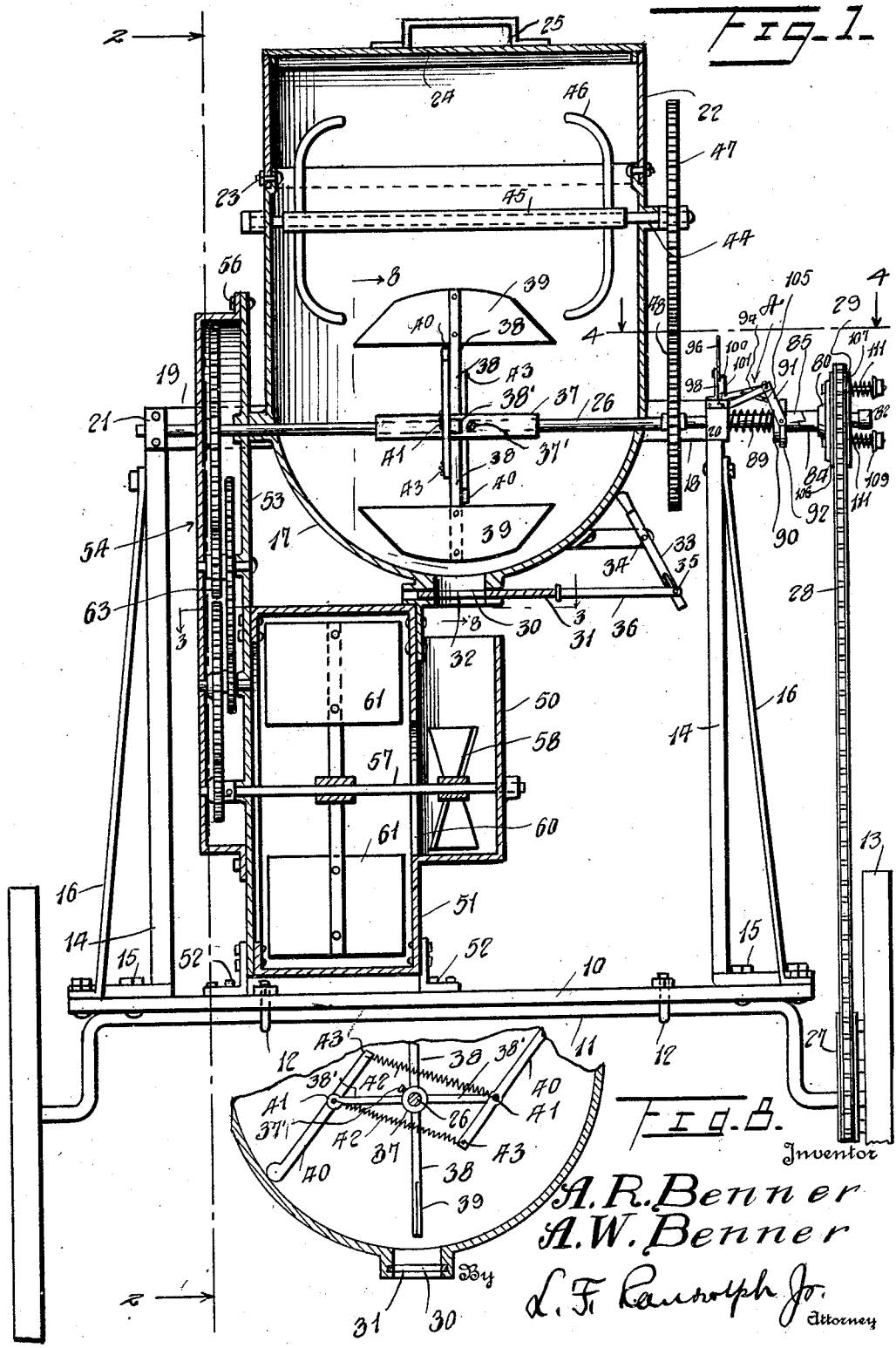

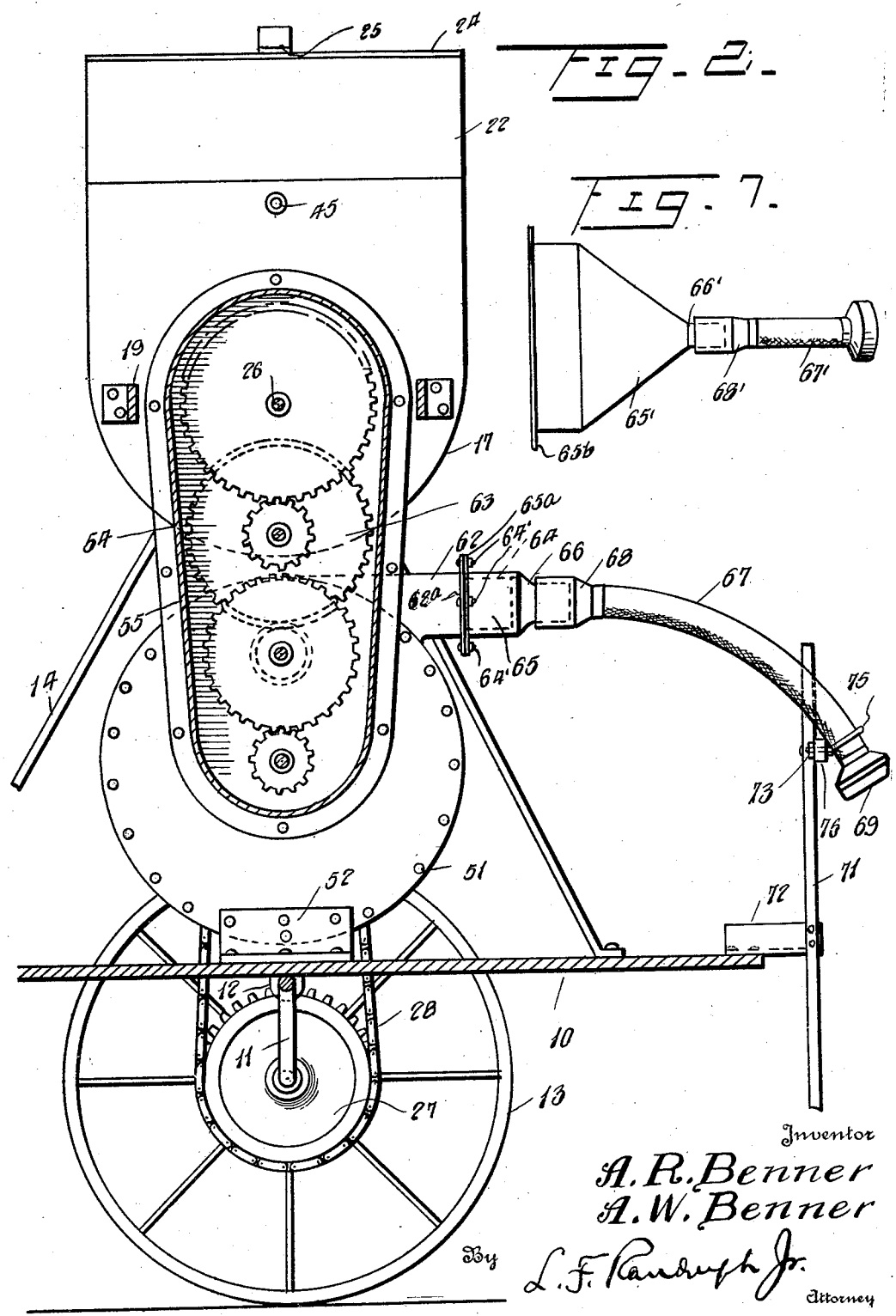

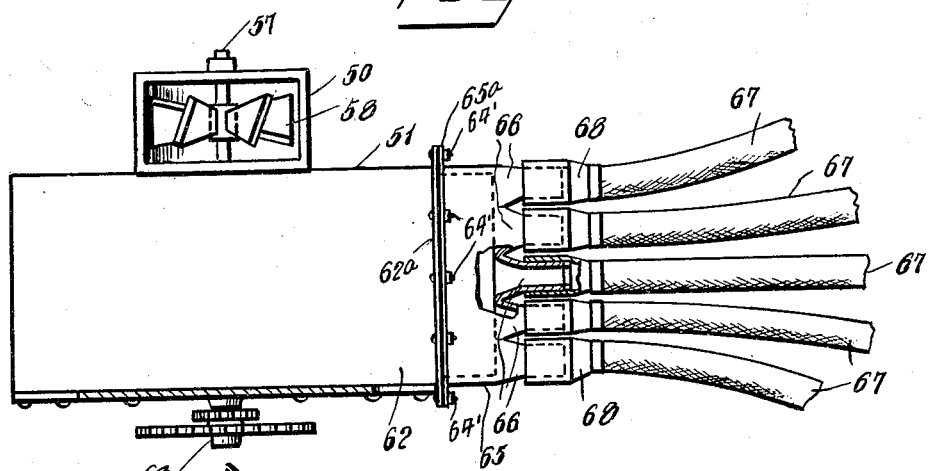

1,840,805

UNITED STATES PATENT OFFICE

ARNOLD R. BENNER AND AUGUST W. BENNER, OF LOUISE, TEXAS

VEGETATION DUSTING MACHINE

Application filed May 22, 1930. Serial No. 454,731.

This invention relates to a machine primarily adapted for dusting or applying poison to cotton plants or other vegetation for the purpose of exterminating parasites.

It is aimed to provide a novel machine capable of manufacture at minimum cost and which will be durable and efficient in use, acquiring its power for operation from the ground wheels of the vehicle or body upon which it is supported.

Another object is to provide a novel construction having a hopper wherein the powder or poison is effectively and positively agitated, in which the material as it discharges from the hopper is mixed, then enters a blower and is blown in the direction of the vegetation or plants under treatment.

The more specific objects and advantages will become apparent from a consideration of the description following taken in connection with accompanying drawings illustrating an operative embodiment.

In said drawings:—

Figure 1 is a view of the machine in vertical transverse section substantially centrally of the hopper, Figure 2 is a vertical sectional view taken on the line 2—2 of Figure 1, Figure 3 is a cross sectional view taken on the line 3—3 of Figure 1, Figure 4 is a cross sectional view taken on the line 4—4 of Figure 1, Figure 5 is a central longitudinal sectional view taken on the line 5—5 of Figure 4, Figure 6 is a front elevation of the supporting means for the distributing hose, Figure 7 is a plan view of a modified form of distributing head and hose, and Figure 8 is a side view of spider arms and springs.

Referring specifically to the drawings wherein like reference characters designate like or corresponding parts, 10 designates a mobile body or platform, which may be a wagon bed, or a member adapted to be drawn by a wagon, a tractor, a truck or the like. Said body 10 has an axle 11 clamped thereto as at 12 and which mounts ground wheels 13.

Standards 14 are rigidly bolted at 15 to the platform 10. Braces 16 are fastened to the standards 14 and to the platform 10. At 17 a hopper is shown which is adapted to contain the poison or other powder which is adapted to be distributed. The hopper 17 has brackets 18 and 19 fastened to opposite sides thereof which in turn are fastened to crown blocks 20 and 21, fastened to or forming part of the standards 14.

Said hopper 17 has an upper section 22 which is detachably secured in place as by means of bolts 23, such section when removed enabling positioning of the different parts within the hopper for operation. Section 22 is provided with a removable lid or cap 24 having a handle 25.

Rotatably journaled in the hopper 17 and in the crown blocks 20 and 21 is an operating shaft 26. Such shaft 26 is adapted to be driven from one of the ground wheels 13 to which end such wheel has a sprocket 27 thereon over which a sprocket chain 28 is trained which also traverses a sprocket 29 coaxial with the shaft 26 and at times adapted to be connected therewith and detached therefrom through the medium of a clutch mechanism at A.

The hopper 17 has a discharge opening in its bottom as at 30 the extent of which is controlled through the position of a valve or cut-off plate 31, perforated as at 32 to aline with the opening 30. In order to manually adjust the valve 31, a hand lever 33 is pivoted at 34 to the hopper and has a bolt and slot forming a pivotal and slide connection at 35 with an extension 36 of the valve 31.

A hub 37 is secured by a set screw 37' to shaft 26 within the hopper and has two spokes or arms 38 radiating therefrom which carry blades 39. The blades 39 operate to evenly feed the powder to and through the opening 30 and assist in agitating the powder to cause it to properly gravitate to the opening 30. On two additional spokes 38' feed arms 40 are pivoted at 41. To each pivot 41, a coil spring 42 is fastened which is also fastened at 43 to the end of the adjacent arm 40. As shaft 26 rotates, arms 40 also rotate and press against the bottom of hopper 17, tensioning springs 42 so that the arms are drawn down rapidly which prevents opening 30 from clogging with poison powder.

A shaft 44 is journaled in the hopper 17 and it carries an agitator 45 of suitable form having agitating arms 46, adapted to keep the powder in motion adjacent the top of the hopper. Exteriorly of the hopper, a gear wheel 47 is keyed to the shaft 44 and it is in mesh with a gear wheel 48 keyed to shaft 26 so that the rotation of the latter will operate gear wheel 47, shaft 44 and the agitator 45.

The material discharged through the opening 30 is received in a mixing chamber 50 in the nature of a lateral extension of a blower casing 51, the latter being fastened as by brackets 52 to the platform or bed 10. One side of the blower casing 51 is covered by a plate 53 forming part of a gear casing 54 which is completed by a flanged cover plate 55. Said gear casing extends materially above the blower casing 51 and the shaft 26 passes through the same and is journaled in its plate. The walls 53 and cover plate 55 forming such gear casing are detachably connected together as by means of bolts 56.

A shaft 57 is journaled in the mixing chamber 50, and walls 53 and 55. Shaft 57 has a fan or agitator 58 thereon located within the mixing chamber 50 and adapted to mix powder received therein and move or discharge it laterally through a port 60 in the adjacent wall of blower casing 51 and thence into such casing. Within such casing an agitator or fan structure having any suitable number of blades, is shown at 61, being designed to travel at great speed and discharge the mixed powder or material therefrom through a tangential outlet tube 62, best shown in Figure 2. The shaft 57 and accordingly the agitators 58 and 61 are driven from the shaft 26 through a chain of speed increasing gearing 63 located in the casing 54 and supported by a shaft fastened in the walls thereof, one gear of the train being keyed to the shaft 26 and another to the shaft 57.

The free end of tube 62 has a reduced extension of nozzle 64 and a flange 62ª at the base of said reduced extension. A distributor head 65 telescopes over the nozzle 64 and has a flange 65ª that is adapted to be detachably secured in place by bolts 64' passing through flanges 62ª and 65ª on the tube and head respectively. Any suitable number of powder distributing hose 67 may be employed, the same being for instance flexible and having couplings 68 detachably fastened to the nipples 66 and at the opposite end terminating in suitable nozzles 69.

A supporting bar 70 is fastened transversely of the platform 10 as by means of uprights 71 secured to the platform by brackets 72. Bar 70 is adjustable as to height since it is secured in place by bolts 73 passed through selected openings 74 of the uprights 71 and of the bar 70. Loops 75 may secure the tube or hose 67 to said bar 70. Such bar 70 may be of any desired length so as to direct the nozzles 69 to cover any desired area. When the area to be covered is wider than the machine, the bar 70 has end sections 76 which may have hose attached thereto and which are hinged at 77 to the remainder of the bar, whereby the sections 76 may be thrown upwardly and inwardly and over the bar 70. This prevents damage to the machine and enables it to pass through restricted doorways and the like.

Various changes may be resorted to within the spirit and scope of the invention. For instance as shown in Fig. 7, a single hose 67' may be used in lieu of the plurality at 67, the same being of identical construction as those at 67, but the distributing head 65' used in place of that at 65 has a single nipple 66' engaged by the coupling 68'. Head 65' is provided with a flange 65ᵇ to be secured to the flange 62ª by bolts 64', hereinbefore referred to. With such a construction, the end sections 76 of the bar 70 would be omitted.

Reverting to the clutch A and adjacent parts, the sprocket ring 29 is of yieldable construction. Such sprocket ring employs a hub 80 which is loosely journaled on the shaft 26 and held against movement axially of said shaft in one direction by means of a pin or abutment 81 on the shaft and in the other direction by a cap 82 screw threaded to the hub at 83. Such hub 80 has a clutch end or jaw 84 which is adapted to be engaged by a slidable clutch jaw 85 mounted on the shaft 26 so as to turn therewith. Such slidable mounting is effected by a pin 87 on shaft 26 disposed in an elongated slot 88 of the jaw 85. Jaw 85 is normally in engagement with the jaw 84 and maintained in and urged to that position by an expansive spring 89 surrounding shaft 26 and abutting block 20 at one end and jaw 85 at the other end. Jaw 85 has an annular flange 90 at the rear end thereof.

Hub 80 has a circumferential flange 106 that engages on one side of an inwardly extending flange 29' on sprocket ring 29. A disk 107 mounted on hub 80 engages on the opposite side of flange 29', and 108 indicates bolts extended through openings in said flange 106 and disk 107. Secured on bolts 108 are cup shaped washers 109 by means of nuts 110, and 111 indicate expansible springs on said bolts 108 and terminally engaging in washers 109 and against disk 107 to yieldingly hold disk 107 and flange 106 in engagement with flange 29' to admit of slip of sprocket ring 29 in event of a sudden jerk by a team or tractor which prevents breakage.

A yoke 91 has a collar 92 pivoted thereto at 93, such collar 92 being arcuate or otherwise as preferred and engaging in front of and against the flange 90. Supporting brackets or arms are fastened rigidly to blocks 20 and the yoke 91 is pivoted thereto as by means of bolts at 95. An operating lever 96 is employed for the yoke 91 and accordingly for the purpose of disengaging the clutch jaw 85. Lever 96 is pivoted at 97 to a bracket 98 fastened on the block 20. Pivoted to a crank 99 on an axis at 100 parallel to the axis 97 is a link 101 which has its other end 102 arranged at a right angle to the end 100 and pivoted to a bar or link 103 rigidly bolted or otherwise fastened at 104 to the yoke 91. A U-shaped brace 105 passes through the bar 103 and at its terminals is fastened to the legs of the yoke 91.

It will be realized that normally the jaws 85 and 84 are in engagement because of the action of spring 89. When desired, the lever 96 may be actuated to retract the jaw 85 and thus disengage the clutch.

Obviously the case 54 may be arranged to carry oil or lubricant and the various gears may be arranged to travel on ball bearings or the like if preferred.

We claim as our invention:—

1. A distributing machine of the class described comprising a hopper, a blower having a casing, a mixing chamber in communication with the casing arranged to receive material discharged from the hopper, a plate closing one side of the blower and extending materially above the same, a cover over said plate and jointly therewith constituting a gear casing, an operating shaft journaled in the hopper and extending into the casing, gearing in said casing driven by said shaft, an operative connection between said gearing and said blower, agitating means within the hopper driven by the shaft and agitating means within the mixing chamber driven by the blower.

2. A distributing machine of the class described comprising a hopper, a blower having a casing, a mixing chamber in communication with the casing arranged to receive material discharged from the hopper, a plate closing one side of the blower and extending materially above the same, a cover over said plate and jointly therewith constituting a gear casing, an operating shaft journaled in the hopper and extending into the casing, gearing in said casing driven by said shaft, an operative connection between said gearing and said blower, a platform supporting the blower, standards rising from the platform, said shaft being journaled in the standards, and supporting means between the standards and the hopper.

3. A distributing machine of the class described comprising a hopper, a blower having a casing, a mixing chamber in communication with the casing arranged to receive material discharged from the hopper, a plate closing one side of the blower and extending materially above the same, a cover over said plate and jointly therewith constituting a gear casing, an operating shaft journaled in the hopper and extending into the casing, gearing in said casing driven by said shaft, an operative connection between said gearing and said blower, an agitating device in the hopper above said shaft, means to operate said agitating device from said shaft, and agitating means carried by said shaft and variable as to position by centrifugal force.

In testimony whereof we affix our signatures.

ARNOLD R. BENNER.
AUGUST W. BENNER.